United States Patent [19]

Buecken et al.

[11] Patent Number: 5,259,908
[45] Date of Patent: Nov. 9, 1993

[54] HEAT VULCANIZABLE ADHESIVES AND A METHOD FOR BONDING

[75] Inventors: Hans J. Buecken, Monheim-Baumberg; Julius Herold, Monheim; Peter Hofmann, Duesseldorf, all of Fed. Rep. of Germany

[73] Assignee: Henkel Kommanditgesellschaft auf Aktien, Duesseldorf, Fed. Rep. of Germany

[21] Appl. No.: 554,107

[22] Filed: Jul. 18, 1990

Related U.S. Application Data

[63] Continuation of Ser. No. 264,479, Oct. 28, 1988, abandoned.

[30] Foreign Application Priority Data

Oct. 20, 1988 [DE] Fed. Rep. of Germany ....... 3835740

[51] Int. Cl.$^5$ .................................................. B32B 31/00
[52] U.S. Cl. .................................. 156/281; 156/307.3; 156/334; 428/462; 525/332.5; 525/332.8; 525/333.2
[58] Field of Search ............. 156/307.3, 281, 334, 156/280; 525/332.5, 333.2, 332.8; 428/462

[56] References Cited

U.S. PATENT DOCUMENTS

| | | | |
|---|---|---|---|
| 1,700,779 | 2/1929 | Stine et al. | 525/332.5 |
| 3,897,583 | 7/1975 | Bellamy | 156/307.3 |
| 4,600,745 | 7/1986 | Creighton | 524/534 |
| 4,824,512 | 4/1989 | Kohlstaft | 156/334 |

FOREIGN PATENT DOCUMENTS

| | | |
|---|---|---|
| 0067488 | 6/1982 | European Pat. Off. . |
| 0097394 | 9/1983 | European Pat. Off. . |
| 0256316 | 7/1987 | European Pat. Off. . |
| 60-112873 | 6/1985 | Japan . |
| 579238 | 7/1946 | United Kingdom . |

OTHER PUBLICATIONS

Ullmann's Encylopedia of Industrial Chemistry, vol. A9, pp. 63–41.
Hackh's Chemical Dictionary, Fourth Edition, p. 718.

*Primary Examiner*—John J. Gallagher
*Attorney, Agent, or Firm*—Ernest G. Szoke; Wayne C. Jaeschke; Daniel S. Ortiz

[57] ABSTRACT

Heat-vulcanizable adhesives for the bonding of solids, the adhesive contains polybutadiene or a polybutadiene mixture and/or copolymers of butadiene with ethylenically unsaturated monomers and other vulcanizable components, and at least 0.5% by weight (based on the weight of vulcanizable components) of a metal salt as a hardening catalyst. The adhesive is particularly useful in vehicle assembly. The adhesive in less than 5 hours exposure to air forms a protective skin which imparts washer resistance to the adhesive.

21 Claims, No Drawings

HEAT VULCANIZABLE ADHESIVES AND A METHOD FOR BONDING

This application is a continuation of application Ser. No. 07/264,479 filed on Oct. 28, 1988, now abandoned.

BACKGROUND OF THE INVENTION

1. Field of the Invention

The invention is heat-vulcanizable adhesives, for the bonding of solid substrates, which contain polybutadiene or polybutadiene mixtures and/or copolymers of butadiene with olefins and/or diolefins, and optionally other vulcanizable components. The invention also relates to the use of the heat-vulcanizable adhesives in methods for the bonding of solids, particularly steel sheets for automobile or vehicle assembly.

2. Statement of Related Art

The adhesive bonding of steel sheet in vehicle assembly, and particularly in automobile body assembly, is often done using uncleaned and untreated steel sheet. The adhesive is hardened later in the lacquer drying ovens. Prior to adhesive hardening in the lacquer drying ovens the joined parts will pass through cleaning, phosphatizing, and dip-priming stages. However, the unhardened adhesive can be washed from the glued seam by the aqueous agents used in these process steps. Various measures are known for preventing wash-out of the adhesive. For example, thermal inductive pre-hardening of the adhesive, use of a solvent-containing adhesive formulation, use of two-component formulation, or use of a strip or a round cord form have been attempted to prevent wash-out. These measures have disadvantages or require the installation of special equipment.

EP-A 0 097 394 (equivalent to U.S. Pat. No. 4,600,745) discloses a heat-vulcanizable polybutadiene-based adhesive which contains, in addition to polybutadiene or a polybutadiene mixture, sulfur, a filler, a water-binding agent (particularly CaO), vulcanization auxiliaries, and vulcanization accelerators. In particular, these adhesives have poor resistance to being washed away in the aqueous cleaning, phosphatizing, and dip-priming stages. The contents of U.S. Pat. No. 4,600,745 are incorporated herein by reference.

BRIEF DESCRIPTION OF THE INVENTION

Other than in the operating examples, or where otherwise indicated, all numbers expressing quantities of ingredients or reaction conditions used herein are to be understood as modified in all instances by the term "about".

The invention is an improved heat-vulcanizable polybutadiene-based adhesive, which can be processed using commonly available application equipment and which rapidly forms a skin after application without completely hardening. The skin protects the adhesive from the effects of the cleaning, phosphatizing, and dip-priming agents.

In accordance with the invention, a heat-vulcanizable adhesive is provided comprising polybutadiene which contains at least 0.5 weight % (based on the weight of polybutadiene, butadiene copolymer, and other optional vulcanizable components) of at least one metal salt, as a hardening catalyst, which forms a skin on the surface of the adhesive within less than 5 hours in the presence of atmospheric oxygen.

The adhesive of the invention is suitable for the bonding of solids, and particularly steel, glass, ceramics, plastics and the like in order to produce composites of the same or different materials. The composition can also be used to seal and protect materials from contact with moisture.

DETAILED DESCRIPTION OF THE INVENTION

As used in the present application, polybutadiene refers to the different, structurally isomeric homopolypolymers of 1,3-butadiene. Butadiene homopolymers occur in two structurally isomeric forms, i.e., as 1,4-polybutadiene and 1,2-polybutadiene. 1,4-Polybutadienes are linear and unbranched and contain main-chain double bonds and can have a cis or trans configuration. 1,2-Polybutadiene contains side groups which have a vinylic double bond.

All of the aforementioned polybutadiene isomers are suitable for use in the adhesive of the present invention. For example, cis-1,4-polybutadiene is used in a preferred embodiment of the invention, particularly cis-1,4-polybutadiene having at least 70% in the cis-configuration. Polybutadienes having 80 or even 98% in the cis-configuration are particularly useful. These polybutadienes are commercially available. It is known that cis-1,4-polybutadiene has good hardening properties, and therefore these materials are particularly preferred when rapid skinning is required.

Furthermore, within the context of the invention 1,4-polybutadiene which contains more than 50% trans configuration, for example, having 60 to 98% in the trans configuration are useful. Poly-1,2-butadienes, containing vinylic double bonds, can also be used. Compounds having 20 to 99% pendant double bonds, for example, compounds containing more than 40%, more than 80%, or even more than 90% of pendant double bonds, are useful materials.

In most cases, mixtures of isomers of polybutadiene are used for the adhesives of the invention. For example, 1,4-polybutadienes which contain 20 to 70% in the cis configuration and/or 20 to 50% in the trans configuration and which can also have 0 to 3%, or 3 to 30%, or more side groups with vinylic double bonds can be used. Polybutadienes can be produced in the different configurations according to known methods of polymer chemistry, as shown in, H. G. Elias, "Macromolecules," Fourth Edition, Huethig & Wepf Publishing Company, Basel, Heidelberg, New York, p. 676 ("Cis" to "Trans" Configuration Change) and pp. 744–746 and 1012 ff.

In a particularly preferred embodiment of the invention, at least one of the polybutadienes comprising at least 50% by weight of the polybutadiene mixture contains at least 70% in the cis-configuration.

In another preferred embodiment of the invention, the polybutadiene or mixtures of polybutadienes have a number-average molecular weight in the range of 1,000 to 10,000.

Copolymers of butadiene with olefins and/or diolefins, for example, with styrene or acrylonitrile, can be used in the heat-vulcanizable adhesive of the invention in place of polybutadiene or in mixture with polybutadiene. The preferred butadiene copolymers contain at least 40 weight % and preferably at least 60 weight % butadiene. The adhesive of the invention can also contain other vulcanizable components, for example, polychlorobutadiene, polyisoprene, EPDM rubber, butyl rubber, acrylate rubber, and chlorobutyl rubber and bromobutyl rubber.

In another preferred embodiment of the invention, the hardening catalysts are selected from the group of carboxylic acid salts of cobalt, lead, zinc, manganese, cerium, and zirconium. The carboxylic acid moiety of these metal salts can be a monocarboxylic or polycarboxylic acid moiety. The metal salts are the known drying agents for drying oils; see Ullmann, Encyclopedia of Industrial Chemistry, Fifth Edition, Volume A9, Verlag Chemie Weinheim (1987), pp. 63/64. Particularly preferred hardening catalysts are the cobalt, lead, manganese, and zirconium salts of monocarboxylic acids such as naphthenic acid or isooctanoic acid. The skin formation which is a useful feature of the invention is undesirable in the drying of drying oils, and these metal salts are used in very low concentrations, usually combined with agents to prevent skin formation.

The operable upper limit for the concentration of hardening catalyst, in accordance with the invention, can be easily determined by the individual skilled in the art. The effective upper limit is the amount of hardening catalyst at which the rate of skin formation on the surface of the adhesive cannot be increased or can be increased only insignificantly by addition of catalyst. Preferably, a hardening catalyst content of 1 to 10 weight % (based on the weight of polybutadiene, polybutadiene copolymer, and other optional vulcanizable components) is used.

In another preferred embodiment of the invention, the heat-vulcanizable adhesives of the invention contain sulfur and/or sulfur-containing vulcanization agents. Sulfur-containing vulcanization agents, are accelerators and auxiliaries, aging and fatigue inhibitors are described in Ullmann, Encyclopedia of Industrial Chemistry, Fourth Edition, Volume 13, pp. 639-654, Verlag Chemie Weinheim (1977), which is incorporated herein by references. Typical examples of sulfur-containing vulcanization agents, that is, sulfur donors, are dimorpholyl disulfide, 2-morpholinodithiobenzothiazole, caprolactam disulfide, and dipentamethylenethiuram tetrasulfide, as well as known thioplasts.

In another preferred embodiment of the invention, the heat-vulcanizable adhesives contain vulcanization accelerators and vulcanization auxiliaries. These are familiar to the individual skilled in the art of rubber vulcanization, see Ullmann, loc. cit., pp. 639-644. Ageing and fatigue inhibitors are described at Ullmann, loc. cit., pp. 644-650.

Zinc oxide is a particularly preferred vulcanization auxiliary for use in the composition of the invention. Particularly useful vulcanization accelerators are, for example,
2-mercaptobenzothiazole,
dibenzothiazyl disulfide,
the zinc salt of 2-mercaptobenzothiazole,
benzothiazyl-2-cyclohexylsulfenamide,
benzothiazyl-2-tert-butylsulfenamide,
benzothiazyl-2-sulfene morpholide,
benzothiazyldicyclohexylsulfenamide,
diphenylguanidine,
di-ortho-tolylguanidine,
ortho-tolylbiguanide,
tetramethylthiuram disulfide,
tetramethylthiuram monosulfide,
zinc N-dimethyldithiocarbamate,
zinc N-diethyldithiocarbamate,
zinc N-dibutyldithiocarbamate,
zinc N-ethylphenyldithiocarbamate,
zinc N-pentamethylenedithiocarbamate,
ethylenethiourea,
diethylthiourea, and
diphenylthiourea.

In another preferred embodiment of the invention, the heat-vulcanizable adhesive contains a filler. Filler materials are well known to the rubber specialist, and comprise compositions such as calcium carbonate, talc, pyrogenic silica, and carbon black. Pigments with a filler character are also included among fillers useful in the composition of the invention. Other suitable fillers can be found in the aforementioned Ullmann, Fourth Edition, Volume 13, pp. 650-654.

According to another preferred embodiment of the invention, the heat-vulcanizable adhesive contains a water-binding agent, which functions to prevent pores from being formed in the hardened adhesive by water which may be present in the adhesive. Calcium oxide is a particularly preferred water-binding agent for the adhesive of the invention.

The adhesive of the invention can also contain additives which are useful in vulcanizable compositions, such as aging and fatigue inhibitors, as are described in greater detail in the aforementioned Ullmann, Fourth Edition, Volume 13, pp. 644-650.

In another preferred specific embodiment of the invention, the vulcanizable adhesive has the following composition:
a) 20 to 50 parts by weight polybutadiene or polybutadiene mixture;
b) 1 to 8 parts by weight sulfur and/or sulfur-containing vulcanization agent;
c) 30 to 70 parts by weight filler;
d) 1 to 10 parts by weight water-binding agent;
e) 2 to 8 parts by weight vulcanization auxiliary;
f) 1 to 6 parts by weight vulcanization accelerator;
g) 0.5 to 10 weight % (based on polybutadiene or the polybutadiene mixture) a metal salt hardening catalyst; and optionally
h) additives such as aging inhibitors, fatigue inhibitors, or the like in the typical quantities.

Particularly preferred are heat-vulcanizable adhesives of the invention with the following composition:
a) 20 to 50 parts by weight polybutadiene or polybutadiene mixture;
b) 4 to 6 parts by weight sulfur;
c) 40 to 60 parts by weight of at least one filler from the group comprising calcium carbonate, talc, and carbon black;
d) 3 to 8 parts by weight calcium oxide as water-binding agent;
e) 3 to 5 parts by weight zinc oxide as vulcanization auxiliary;
f) 2 to 5 parts by weight vulcanization accelerator;
g) 0.5 to 10% by weight (based on the weight of polybutadiene or the polybutadiene mixture) of at least one metal salt as hardening catalyst; and optionally
h) the usual additives such as aging inhibitors, fatigue inhibitors, and the like.

The invention also relates to methods for the laminar bonding of surfaces of solids, and particularly steel sheets for vehicle assembly, using the heat-vulcanizable adhesive of the invention. The adhesive is applied to the surface of at least one solid element, the surfaces to be bonded are joined, and the adhesive hardened under the effect of heat. Particularly preferred is the use of the adhesive of the invention in methods in which the surfaces to be joined may carry impurities, in particular impurities such as adhering greases or oils, in which the bonded solid elements are cleaned, phosphatized, and dip-primed after joining and before hardening of the adhesive, and then the adhesive is hardened during enamelling under the action of heat.

The invention is explained in greater detail by the following examples which are presented for illustration only and are not intended to be limiting.

EXAMPLES 1 TO 4 was no shift in the glue lines or loss of adhesive at the indicated skin formation times.

The tensile shear strength was measured according to DIN 53,283 after a hardening time of 30 minutes at 180° C. in an air-circulation oven for a 2 and 0.3 mm layer thickness.

It can be seen from Table 1 that the adhesives of the invention formed the desired stabilizing skin after 2 to 3.5 hours. The adhesive of the comparison formulation did not form a washer resistant skin after more than 72 hours.

TABLE 1

|  |  | Examples |  |  |  | Comparison |
|---|---|---|---|---|---|---|
|  |  | 1 | 2 | 3 | 4 |  |
| PB, 80% 1,4-cis, MW = 3,000 |  | 270 | 320 | — | — | — |
| PB, 75% 1,4-cis, MW = 1,500 |  | — | — | 290 | 160 | 310 |
| PB, 40–50% vinyl-1,2, MW = 1,800 |  | 50 | — | — | 120 | — |
| PB, 98% 1,4-cis, Mooney viscosity = 48 |  | — | — | 20 | 10 | — |
| Calcium carbonate |  | 240 | 240 | 255 | 305 | 235 |
| Talc |  | 255 | 255 | 260 | 200 | 255 |
| Calcium oxide |  | 50 | 50 | 50 | 50 | 50 |
| Zinc oxide |  | 40 | 40 | 40 | 40 | 40 |
| Sulfur |  | 40 | 40 | 40 | 60 | 50 |
| Dibenzothiazyl disulfide |  | 50 | 50 | 30 | 30 | 60 |
| Co naphthenate | hardening catalyst | 5 | 5 | — | — | — |
| Lead octoate (38–40% Pb) | according to | — | — | 10 | 15 | — |
| Co octoate (12% Co) | DIN 55,910 | — | — | 5 | 10 | — |
| Skin formation time, hours |  | 3.5 | 3.5 | 2 | 2 | >72* |
| Tensile shear strength, MPa (DIN 53,283) after hardening 30 minutes at 180° C. |  |  |  |  |  |  |
| 2 mm layer thickness |  | 1.7 | 1.4 | — | — | 1.4 |
| 0.3 mm layer thickness |  | — | — | 1.6 | 2.0 | — |

(PB = polybutatiene, MW = number-average molecular weight)
*very thin skin without a complete penetrating drying The components listed in Table 1 were mixed for one hour in a commercial planetary paddle mixer with a capacity of 500 kg.

Table 1 also reports a formulation used as a comparison example, the skin formation times (in hours) and the tensile shear strengths for all the formulations.

The time (in hours), at room temperature, required to form a skin which stabilized the applied adhesive against the effects of washing, phosphatizing, and dip-priming ("washer resistance") was used as the "skin formation time". Washer resistance must be achieved within 2 to 5 hours, which corresponds to the time between application of the adhesive on the work and the need for washer resistance in a production operation. However, as can be seen from the comparison example, the product which does not contain a metal salt drying agent of the invention did not form a washer resistant skin but formed a skin which remained very thin, due to the absence of a thorough drying, even after more than 72 hours. Washer resistant protection of the adhesive was not achieved in this case.

The washer resistance was determined by spraying hot water on and/or between applied glue lines according to the following test method:

Two glue lines (250×30×2 mm) were applied at a distance of 50 mm from one another on an oiled steel sheet (300×300 mm). After a prescribed standing time at room temperature, the horizontally positioned sample was exposed to a water jet at 50° C.±5° C. at a pressure of 68 kN/m² through a No. ½ GG-25 Full Jet nozzle from the Spraying System Company. The distance between sample and nozzle was 250 mm. The water jet was directed between the lines for one minute. The degree of deformation or shift in the glue line was subsequently evaluated and the quantity of adhesive which remained was determined gravimetrically. There

We claim:

1. A method for bonding at least two solid substrates which comprises: applying to at least one surface of at least one solid to be bonded, a heat vulcanizable adhesive comprising: at least one vulcanizing agent, in an amount sufficient for vulcanization of the adhesive, at least one member selected from the group consisting of polybutadiene, mixtures of polybutadienes, copolymers of butadiene with ethylenically unsaturated monomers and mixtures thereof and an effective amount of a metal salt hardening catalyst to form a washer resistant skin on the surface of the adhesive in less than about five hours exposure to atmospheric oxygen, said effective amount of the metal salt hardening catalyst, being at least about 0.5% by weight of the heat vulcanizable components, joining the surface carrying the adhesive with the substrate to be bonded, exposing the adhesive to air for a sufficient time to form a washer resistant skin on the adhesive, and heating the joined substrates to vulcanize the adhesive.

2. A method of claim 1 wherein the heat vulcanizable adhesive comprises: 1,4-polybutadiene containing at least 70% in the cis configuration.

3. A method of claim 1 wherein the heat-vulcanizable adhesive comprises a mixture of polybutadienes, at least one of the polybutadienes, comprising the polybutadiene mixture contains at least 70% in the cis configuration and comprises at least 50% by weight of the polybutadiene mixture.

4. A method of claim 1 wherein in the heat-vulcanizable adhesive the polybutadiene or the polybutadienes comprising the polybutadiene mixture has a number-average molecular weight in the range of from about 1,000 to about 10,000.

5. A method of claim 1 wherein the heat vulcanizable adhesive comprises copolymers of butadiene having a butadiene content of at least 40% by weight.

6. A method of claim 5 wherein the copolymers have a butadiene content of at least 60% by weight.

7. A method of claim 1 wherein the heat-vulcanizable adhesive comprises a hardening catalyst comprising at least one metal salt selected from the group consisting of the carboxylic acid salts of cobalt, lead, zinc, manganese, cerium, and zirconium.

8. A method of claim 1 wherein the heat-vulcanizable adhesive comprises from about 1 to 10% by weight of at least one hardening catalyst based on the weight of vulcanizable components in the adhesive.

9. A method of claim 1 wherein the heat-vulcanizable adhesive comprises at least one of sulfur or a sulfur-containing vulcanization agent.

10. A method of claim 1 wherein the heat-vulcanizable adhesive comprises at least one vulcanization accelerator.

11. A method of claim 1 wherein the heat-vulcanizable adhesive comprises vulcanization auxiliaries.

12. A method of claim 1 wherein the heat-vulcanizable adhesive comprises at least one filler.

13. A method of claim 1 wherein the heat-vulcanizable adhesive comprises a water-binding agent.

14. A method of claim 1 wherein the heat-vulcanizable adhesive comprises at least one of aging inhibitors and fatigue inhibitors.

15. A method of claim 1 wherein the heat-vulcanizable adhesive comprises:
a) 20 to 50 parts by weight of at least one of polybutadiene or polybutadiene mixture;
b) 1 to 8 parts by weight of at least one of sulfur or a sulfur-containing vulcanization agent;
c) 30 to 70 parts by weight of at least one filler;
d) 1 to 10 parts by weight of a water-binding agent;
e) 2 to 8 parts by weight of a vulcanization auxiliary;
f) 1 to 6 parts by weight of a vulcanization accelerator;
g) 0.5 to 10% by weight (based on weight of polybutadiene or polybutadiene mixture) of the metal salt hardening catalyst; and
h) additives such as aging inhibitors, fatigue inhibitors, and the like.

16. A method of claim 1 wherein the heat-vulcanizable adhesive comprises:
a) 20 to 50 parts by weight polybutadiene of polybutadiene mixture;
b) 4 to 6 parts by weight sulfur;
c) 40 to 60 parts by weight of at least one filler selected from the group consisting of calcium carbonate, talc, pyrogenic silica, and carbon black;
d) 3 to 8 parts by weight of a water-binding agent comprising calcium oxide;
e) 3 to 5 parts by weight of a vulcanization auxiliary comprising zinc oxide;
f) 2 to 5 parts by weight of a vulcanization accelerator;
g) 0.5 to 10% by weight (based on weight of polybutadiene or polybutadiene mixture) of the metal salt hardening catalyst; and
h) at least one additives selected from aging inhibitors and fatigue inhibitors.

17. A method of claim 1 wherein the surfaces to be bonded carry impurities, comprising at least one of adhering grease or oil, and the bonded solid substrates are cleaned, phosphatized, and dip-primed after joining and before adhesive hardening, by the action of heat.

18. A method of claim 1 wherein the joined substrates are exposed to air for a sufficient length of time to form a washer resistant skin and the joined substrates are contacted with an aqueous medium before the joined substrates are heated to harden the adhesive.

19. A method of claim 1 wherein the surfaces of the substrate to be bonded carry impurities comprising at least one of adhering grease or oil and the joined substrates after exposure to air are cleaned and phosphatized before heating.

20. A method of claim 1 wherein the bonded substrates are exposed to air for a sufficient length of time for a washer resistant skin to form on the adhesive before the joined substrates are cleaned phosphatized, and dip-primed.

21. A method of claim 1 wherein the heat vulcanizable adhesive comprises: at least one member selected from the group consisting of sulfur, sulfur containing vulcanizing agents, sulfur containing vulcanizing accelerators, and nitrogen containing vulcanization accelerators.

* * * * *